US011523052B2

(12) United States Patent
Hyaku et al.

(10) Patent No.: US 11,523,052 B2
(45) Date of Patent: Dec. 6, 2022

(54) ELECTRONIC APPARATUS, CONTROL METHOD OF ELECTRONIC APPARATUS, AND NON-TRANSITORY COMPUTER READABLE MEDIUM

(71) Applicant: CANON KABUSHIKI KAISHA, Tokyo (JP)

(72) Inventors: Bunho Hyaku, Ichikawa (JP); Yasufumi Oyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 16/871,426

(22) Filed: May 11, 2020

(65) Prior Publication Data
US 2020/0366837 A1 Nov. 19, 2020

(30) Foreign Application Priority Data
May 14, 2019 (JP) .............................. JP2019-091402

(51) Int. Cl.
H04N 5/232 (2006.01)
G06T 3/00 (2006.01)
G06T 19/00 (2011.01)
H04N 5/225 (2006.01)

(52) U.S. Cl.
CPC ....... H04N 5/23229 (2013.01); G06T 3/0062 (2013.01); G06T 19/006 (2013.01); H04N 5/2258 (2013.01)

(58) Field of Classification Search
CPC ........... H04N 5/23229; H04N 5/23245; H04N 5/23238; H04N 5/23232; G06T 3/0062
See application file for complete search history.

(56) References Cited

U.S. PATENT DOCUMENTS

| | | | | |
|---|---|---|---|---|
| 8,228,364 | B2* | 7/2012 | Cilia | G06V 10/25 348/39 |
| 11,310,459 | B2* | 4/2022 | Katoh | H04N 5/917 |
| 2012/0105579 | A1 | 5/2012 | Jeon et al. | |
| 2012/0206565 | A1* | 8/2012 | Villmer | H04N 5/2252 348/E5.026 |

(Continued)

FOREIGN PATENT DOCUMENTS

| | | |
|---|---|---|
| CN | 102318331 A | 1/2012 |
| CN | 102479052 A | 5/2012 |

(Continued)

OTHER PUBLICATIONS

Translation of JP 2014-222825 A; Nov. 2014; Espacenet (Year: 2014).*

(Continued)

*Primary Examiner* — John Villecco
(74) *Attorney, Agent, or Firm* — Cowan, Liebowitz & Latman, P.C.

(57) ABSTRACT

An electronic apparatus according to the present invention, includes at least one memory and at least one processor which function as: an acquisition unit configured to acquire a captured image; and a control unit configured to control so as to extract a partial range of an image acquired by the acquisition unit and record a moving image that is not a VR image in a storage, and control so as to record a still image that is a VR image in the storage based on the acquired image.

63 Claims, 5 Drawing Sheets

(56) References Cited

U.S. PATENT DOCUMENTS

| | | | |
|---|---|---|---|
| 2014/0071227 A1* | 3/2014 | Takenaka | H04N 5/23238 382/284 |
| 2014/0176542 A1* | 6/2014 | Shohara | G06T 17/00 345/420 |
| 2015/0062363 A1* | 3/2015 | Takenaka | H04N 5/23238 348/218.1 |
| 2015/0172554 A1* | 6/2015 | Adachi | H04N 5/23296 348/240.2 |
| 2017/0085861 A1* | 3/2017 | Rainisto | G06F 3/017 |
| 2017/0134714 A1* | 5/2017 | Soni | H04N 13/117 |
| 2017/0270635 A1* | 9/2017 | Chun | G06F 1/163 |
| 2018/0061000 A1* | 3/2018 | Kawaguchi | G03B 37/04 |
| 2018/0095650 A1* | 4/2018 | Park | G06F 3/04817 |
| 2018/0103195 A1* | 4/2018 | Kim | H04N 5/23203 |
| 2018/0121064 A1* | 5/2018 | Lee | H04N 5/232941 |
| 2018/0146212 A1* | 5/2018 | Hensler | H04N 13/139 |
| 2018/0184000 A1 | 6/2018 | Lee et al. | |
| 2019/0208141 A1* | 7/2019 | Oyama | H04N 5/23238 |
| 2020/0128179 A1* | 4/2020 | Kawasaki | H04N 5/2628 |
| 2020/0213520 A1* | 7/2020 | Shoda | H04N 5/76 |
| 2020/0366836 A1* | 11/2020 | Hyaku | H04N 5/23245 |
| 2021/0321048 A1* | 10/2021 | Ogawa | H04N 13/366 |
| 2022/0094850 A1* | 3/2022 | Morita | H04N 5/23216 |

FOREIGN PATENT DOCUMENTS

| | | | | |
|---|---|---|---|---|
| EP | 3264222 A1 | | 1/2018 | |
| EP | 3316568 A1 | | 5/2018 | |
| JP | 2004040431 A | * | 2/2004 | |
| JP | 2012099887 A | * | 5/2012 | |
| JP | 2012-182730 A | | 9/2012 | |
| JP | 2014-222825 A | | 11/2014 | |
| JP | 2015-115778 A | | 6/2015 | |
| JP | 2015216686 A | * | 12/2015 | H04N 5/23293 |
| WO | WO-2022138574 A1 | * | 6/2022 | |

OTHER PUBLICATIONS

The above patent document was cited in a European Search Report dated Oct. 16, 2020, which is enclosed, that issued in the corresponding European Patent Application No. 20173814.3.

The above documents were cited in a Dec. 21, 2021 Chinese Office Action, which is enclosed with an English Translation, that issued in Chinese Patent Application No. 202010406853.0.

The above document was cited in a Sep. 7, 2022 Chinese Office Action, a copy of which is enclosed with an English Translation, that issued in Chinese Patent Application No. 202010406853.0.

* cited by examiner

ELECTRONIC APPARATUS, CONTROL METHOD OF ELECTRONIC APPARATUS, AND NON-TRANSITORY COMPUTER READABLE MEDIUM

BACKGROUND OF THE INVENTION

Field of the Invention

The present invention relates to an electronic apparatus, a control method thereof, a program, and a storage medium. In particular, the present invention relates to a method for capturing a moving image and a still image.

Description of the Related Art

There has been known an imaging apparatus capable of capturing a VR image having a wide field of view of, for example, 180 degrees or 360 degrees, which is wider than a normal field angle (Japanese Patent Application Publication No. 2015-115778). There has also been known an imaging apparatus capable of capturing still images and moving images at various timings (Japanese Patent Application Publication No. 2012-182730).

There are cases where a user wishes to capture both a VR image and an image with a normal field angle. However, in such a case, the user needs to use both an imaging apparatus capable of capturing VR images and an imaging apparatus capable of capturing images with a normal field angle. This is inconvenient for the user. Also, the user could miss a photo opportunity if taking too much time to switch between the two imaging apparatuses.

SUMMARY OF THE INVENTION

The present invention provides an electronic apparatus that enables capturing of both a VR image and an image with a normal field angle.

An electronic apparatus according to the present invention, includes at least one memory and at least one processor which function as: an acquisition unit configured to acquire a captured image; and a control unit configured to control so as to extract a partial range of an image acquired by the acquisition unit and record a moving image that is not a VR image in a storage, and control so as to record a still image that is a VR image in the storage based on the acquired image.

Further features of the present invention will become apparent from the following description of exemplary embodiments with reference to the attached drawings.

DESCRIPTION OF THE EMBODIMENTS

Figure 1A:
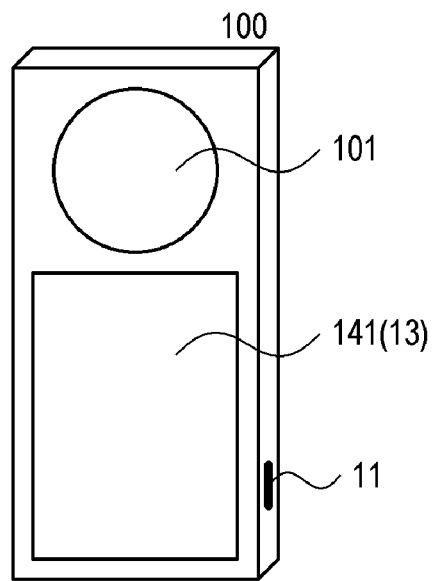
FIGS. 1A and 1B illustrate external views of an imaging apparatus according to the present embodiment.
Figure 1B:
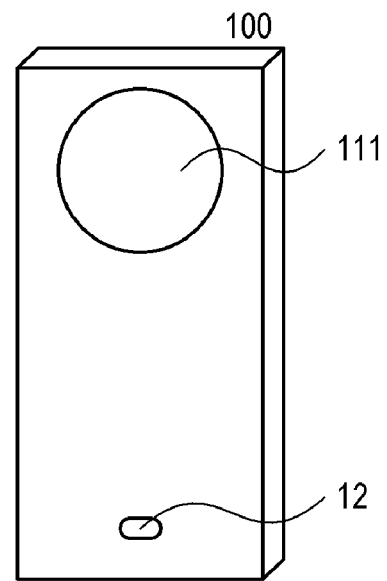

Hereinafter, a preferred embodiment of the present invention will be described with reference to the drawings. FIGS. 1A and 1B illustrate external views of an imaging apparatus 100 as an example of an electronic apparatus to which the present invention is applicable. The imaging apparatus 100 is a lens-integrated digital camera. The imaging apparatus 100 may as well be a single-lens reflex camera or a mirrorless single-lens camera.

FIG. 1A illustrates an external view of a front face of the imaging apparatus 100. A display 141 displays various kinds of images and various kinds of information. The imaging apparatus 100 can cause the display 141 to perform a live-view display (a display of a live-view image in which an object is displayed in almost real time) (display control). In addition, the user can issue various instructions related to imaging capturing (various operations related to image capturing) while checking the object with the live-view display on the display 141. A touch panel 13 provided on a display surface of the display 141 can receive touch operations. A release button 11 is a switch that can be half-pressed or fully-pressed. The user can issue at least one of an instruction to prepare for image capturing, an instruction to start moving-image capturing, an instruction to end moving-image capturing, an instruction to capture a still image, etc. by half-pressing or fully-pressing the release button 11. A lens 101 is a wide-angle lens and forms an image of a luminous flux incident into the lens 101 on an image sensor 102 (not illustrated in FIG. 1A).

FIG. 1B illustrates an external view of a rare face of the imaging apparatus 100. The user can issue at least one of an instruction to prepare for image capturing, an instruction to start moving-image capturing, an instruction to end moving-image capturing, an instruction to capture a still image, etc. by pressing a button 12 or releasing a finger pressing the button 12 therefrom. The lens 111 is a wide-angle lens similar to the lens 101 and forms an image of a luminous flux incident into the lens 111 on an image sensor 112 (not illustrated in FIG. 1B).

Alternatively, the display 141 may be a separate device (an external device such as a smartphone or a tablet terminal connected to the imaging apparatus 100 by wire or wirelessly) from the imaging apparatus 100. For example, the display 141 may be mounted on a smartphone or the like, which is a separate body from the imaging apparatus 100. In this case, since the imaging apparatus 100 can cause the external device to perform a live-view display, the user can issue the various instructions related to image capturing while checking an object on the live-view display of the external device. In addition, an operation to issue the various instructions related to image capturing may be performed by using the separate device from the imaging apparatus 100. For example, the user may perform the operation on a smartphone, which is a separate body from the imaging apparatus 100, and the smartphone may issue an instruction corresponding to this operation to the imaging apparatus 100.

Figure 2:
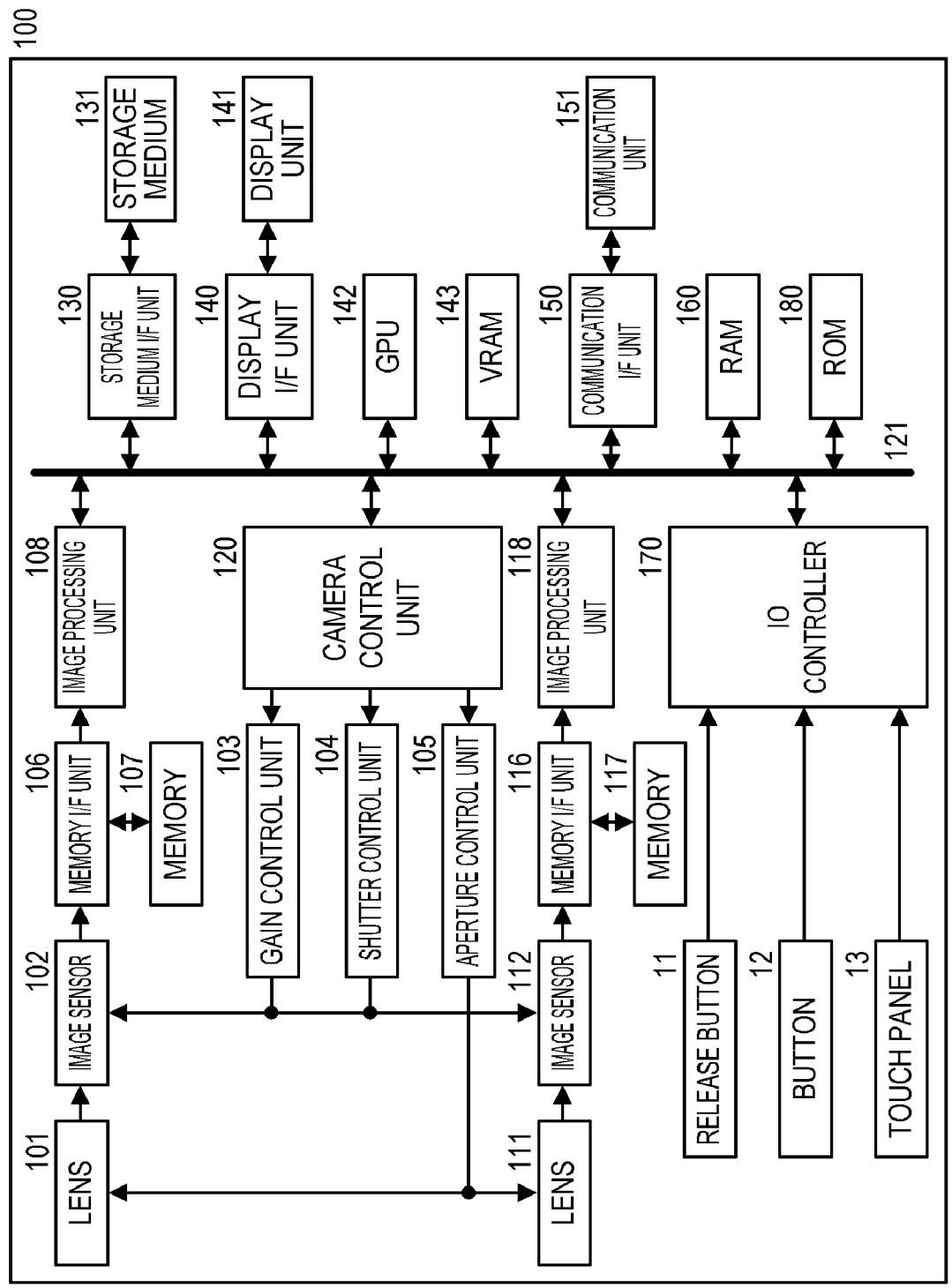
FIG. 2 is a block diagram illustrating an internal configuration of the imaging apparatus according to the present embodiment.

FIG. 2 illustrates an internal configuration of the imaging apparatus 100. While FIG. 2 separately illustrates each function as a constituent element, each function may be realized by hardware such as a single or a plurality of ASICs or programmable logic arrays (PLAs). Alternatively, each function may be realized by a programmable processor such as a CPU or an MPU that executes software.

The lens 101 is a single focus lens including an aperture mechanism, and the focal position of the lens 101 is set to obtain deep focus. However, the lens 101 is not necessarily be a single focus lens.

The image sensor 102 includes a CCD element and a CMOS element and has a configuration in which a plurality of pixels including a photoelectric conversion element is two-dimensionally arranged. The image sensor 102 photoelectrically converts an object image (optical image) formed by an imaging optical system including the lens 101 per pixel. Namely, the image sensor 102 captures an image, generates an analog signal of the image, converts the generated analog signal into a digital signal by an A/D conversion circuit, and outputs the image data on a pixel basis.

A memory I/F unit 106 writes image data for all the pixels output from the image sensor 102 into memory 107. In addition, the memory I/F unit 106 reads out image data held in the memory 107 and outputs the read-out image data to an image processing unit 108. The memory 107 is a volatile storage medium storing image data for several frames (each frame includes image data for all the pixels).

The image processing unit 108 performs processing such as gamma correction, color separation, and color difference matrix on image data (image data for all the pixels) from the memory I/F unit 106, adds a synchronization signal to the image data, and outputs the image data as video data for recording or display. In addition, the image processing unit 108 obtains a photometric value from a luminance value of each pixel of the image data that is input to the image processing unit 108 and provides the photometric value to a camera control unit 120 via a bus 121.

The lens 111, the image sensor 112, a memory I/F unit 116, memory 117, and an image processing unit 118 have functions similar to those of the lens 101, the image sensor 102, the memory I/F unit 106, the memory 107, and the image processing unit 108, respectively. The lens 111, the image sensor 112, the memory I/F unit 116, the memory 117, and the image processing unit 118 perform processing similar to that performed by the lens 101, the image sensor 102, the memory I/F unit 106, the memory 107, and the image processing unit 108, respectively.

The camera control unit 120 is configured by a CPU or the like and controls the entire operation of the imaging apparatus 100. A RAM 160 is used as a work area (work memory) of the camera control unit 120. In the RAM 160, constants and variables to be used for the operation of the camera control unit 120 are recorded, and a program, etc. are expanded. A ROM 180 stores a computer program or the like for operating the camera control unit 120. For example, the camera control unit 120 controls the entire operation of the imaging apparatus 100 by expanding the computer program stored in the ROM 180 in the RAM 160 and executing the computer program.

A gain control unit 103, a shutter control unit 104, and an aperture control unit 105 are used for exposure control. The camera control unit 120 controls the above control units 103 to 105 based on photometric values provided from the image processing unit 108 and the image processing unit 118 or an operation parameter manually set by the user. The gain control unit 103 controls gain of the image sensor 102 and the image sensor 112. The shutter control unit 104 controls shutter speed of the image sensor 102 and the image sensor 112. The aperture control unit 105 controls aperture mechanisms of the lens 101 and the lens 111.

A storage medium I/F unit 130 is an interface for connecting a storage medium 131 to the imaging apparatus 100. The storage medium I/F unit 130 records video data that is input from the image processing unit 108, the image processing unit 118, and a GPU 142 in the storage medium 131 and reads out the recorded video data from the storage medium 131. The storage medium 131 is a storage unit configured by a semiconductor memory or the like.

The display I/F unit 140 outputs video data from the image processing unit 108 and the image processing unit 118 and image data rendered in a video RAM (VRAM) 143 by the GPU 142 to the display 141.

The GPU 142 is a rendering engine that renders, based on an instruction from the camera control unit 120, video data output from the image processing unit 108 and the image processing unit 118 in the VRAM 143 by performing image conversion processing as well as image cut-out processing, enlargement processing, distortion correction, etc. In addition, the GPU 142 performs processing for rendering various kinds of information about the imaging apparatus 100 and a menu screen in the VRAM 143 in a superimposed manner. For example, touch-panel buttons for receiving various instructions from the user are rendered as a graphic user interface (GUI) by the GPU 142 and displayed on the display 141 via the display I/F unit 140.

A communication I/F unit 150 connects to a smartphone, a PC, and the like (not illustrated) located outside the imaging apparatus 100 via a communication unit 151 and transfers image data displayed on the display 141 thereto. In addition, the communication I/F unit 150 receives a control command, etc. to the imaging apparatus 100 from a smartphone, a PC, and the like and notifies the camera control unit 120 of the received control command, etc. The communication unit 151 is a wireless LAN interface for performing wireless communication and performs hardware processing on communication performed by the communication I/F unit 150.

The release button 11, the button 12, and the touch panel 13 have functions described above and output operation information corresponding to an operation (an instruction to prepare for image capturing, an instruction to start moving-image capturing, an instruction to end moving-image capturing, an instruction to capture a still image, etc.) to an IO controller 170. The IO controller 170 outputs the operation information from the various operational units to the camera control unit 120, and the camera control unit 120 performs processing that corresponds to the operation information received from the IO controller 170. For example, the touch panel 13 is superimposed on the display 141 and outputs operation information including coordinate information about a position and a region where a touch operation is performed.

Figure 3:
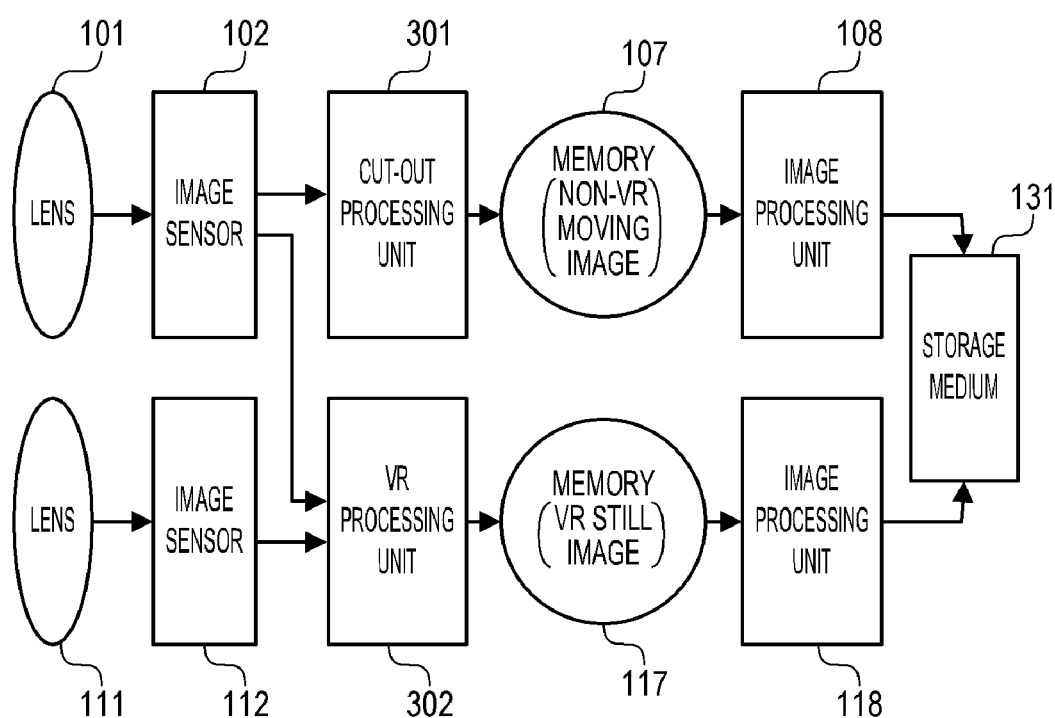
FIG. 3 is a block diagram illustrating an internal configuration of the imaging apparatus according to the present embodiment.

FIG. 3 illustrates an internal configuration of the imaging apparatus 100. FIG. 3 illustrates the configuration in a simplified manner so that characteristic processing of the present embodiment can be represented. Processing performed by a cut-out processing unit 301 and a VR processing unit 302 is realized by, for example, at least one constituent element including the camera control unit 120 in FIG. 2.

The cut-out processing unit 301 is used to generate a moving image that is not a virtual reality (VR) image (non-VR moving image). The VR image will be described below. The cut-out processing unit 301 acquires an image (image data output from the image sensor 102) captured by the image sensor 102. The cut-out processing unit 301 performs cut-out processing for extracting at least a partial range of the acquired image. The cut-out processing unit 301 stores the extracted range of the image (image data) in the memory 107 (moving-image buffering) so that the extracted range of the moving image (non-VR moving image; moving-image data) is temporarily stored in the memory 107. The image processing unit 108 performs compression encoding processing on the moving image stored in the memory 107 and records the moving image (non-VR moving image) obtained by the compression encoding processing in the storage medium 131.

The range to be extracted in the cut-out processing may be a predetermined range such as a central portion (central part) of a range of the image captured by the image sensor 102 or may be a different range. Since the image captured by the image sensor 102 sometimes has distortion, the cut-out processing may include distortion correction to reduce the distortion of the image. By performing the distortion correction, the image with little distortion can be displayed or recorded. Alternatively, a non-VR moving image may be recorded in the storage medium 131 by extracting a partial range of an image captured by the image sensor 112.

The VR processing unit 302 is used to capture a still image which is a VR image (VR still image). The VR processing unit 302 acquires an image captured by the image sensor 102 and an image captured by the image sensor 112 and performs VR processing by using these two images. The VR processing is not performed when a non-VR moving image is captured.

The VR processing is image processing performed on an image captured so as to process the image to be treated as a VR image (an image in a VR format). For example, the VR processing is image processing for obtaining an image in a celestial-sphere format (celestial-sphere image format). In the present embodiment, the VR processing unit 302 performs the following processing in the VR processing. First, by using one of the two images as a reference image and the other as a comparison image, the VR processing unit 302 calculates an amount of deviation between the reference image and the comparison image per area by pattern matching processing and detects a connection position at which the two images are connected, based on the amount of the deviation per area. Next, taking the detected connection position and lens characteristics of each optical system into consideration, the VR processing unit 302 corrects distortion of each image by performing geometric conversion. In this way, each of the images is converted into an image in the celestial-sphere format. Next, the VR processing unit 302 generates a single image in the celestial-sphere format by synthesizing (blending) the two images in the celestial-sphere format. The image (VR image) obtained by the VR processing is an image using equidistant cylindrical projection, for example. Namely, an individual direction from a position (imaging position) at which the image is captured can be associated with an individual position (an individual pixel) in the image. In the present embodiment, each of the image sensors 102 and 112 captures an image that corresponds to a field angle of 180 degrees. Next, by performing the VR processing, a 360-degree image (an omnidirectional image; a celestial-sphere image) that corresponds to a field angle of 360 degrees is obtained from the two images captured by the two image sensors 102 and 112. The above synthesis may be performed when a VR image is VR-displayed (which will be described below), separately from the VR processing. In addition, a 180-degree image (a half-celestial-sphere image) may be generated by cutting out an arbitrary range corresponding to a field angle of 180 degrees from the 360-degree image.

The VR processing unit 302 stores the VR image (VR still image) obtained by the VR processing in the memory 117 (still image buffering). The image processing unit 118 performs compression encoding processing on the still image stored in the memory 117 and records the still image (VR still image) obtained by the compression encoding processing in the storage medium 131. For example, the image processing unit 118 records an image file of the VR still image in the storage medium 131 with VR information. The VR information is information for associating an individual direction from an imaging position with an individual position in the image. For example, the VR information includes at least one of information indicating a position (pixel) that corresponds to a zenith direction, information indicating a position (pixel) that corresponds to a nadir direction, and information indicating that this still image is a VR image. The image processing unit 118 may record the image file of the VR still image in the storage medium 131 with a character string added to its file name, the character string indicating that this image file includes the VR image. For example, the file name of the VR still image may include a three-character string ".vr" in front of the extension ".jpg", such as "123456.vr.jpg". These additions of the VR information and the character string indicating a VR image are not applied when a non-VR moving image is captured.

The VR image will be described next. The VR image is an image that can be VR-displayed (displayed in a display mode "VR view"). For example, the VR image is an image in a celestial-sphere format, in which an individual direction from an imaging position can be associated with an individual position (an individual pixel). In the VR display, a part of the VR image is displayed as a display range. The display range can be freely changed in accordance with an instruction (operation) from the user, a change in the orientation of the display device that performs the VR display, or the like. In the VR display, a display is performed (a display range is determined or changed) such that the user can feel as if the user were in a virtual space (VR space) of the place where the image is captured (the user can get sense of realism and immersion). In other words, the VR display provides a display in which a view from the imaging position is reproduced so that the user can obtain feeling of overlooking every direction from the imaging position.

Figure 4:
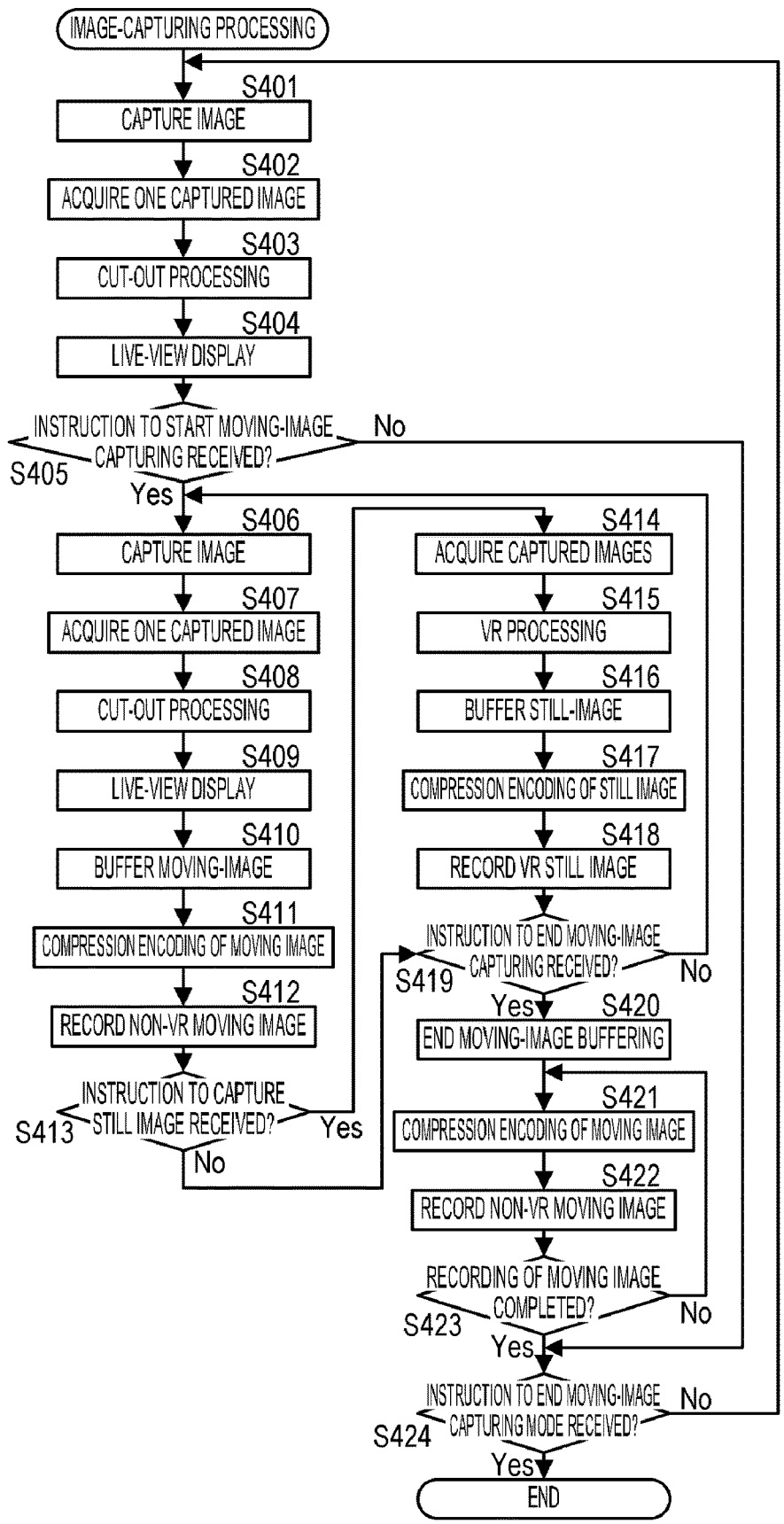
FIG. 4 is a flowchart illustrating an example of image-capturing processing according to the present embodiment.

FIG. 4 is a flowchart illustrating an example of image-capturing processing performed by the imaging apparatus 100. The image-capturing processing in FIG. 4 is realized by the camera control unit 120 that expands a program stored in the ROM 180 in the RAM 160 and executes the program. For example, the image-capturing processing in FIG. 4 starts in response that a moving image capturing mode is set on the imaging apparatus 100. Of a plurality of processing steps in FIG. 4, processing steps performed by a constituent element other than the camera control unit 120 are performed in accordance with instructions from the camera control unit 120.

In step S401, the image sensors 102 and 112 capture images. In step S402, the cut-out processing unit 301 acquires the image captured by the image sensor 102. In step S403, the cut-out processing unit 301 extracts a partial range of the image acquired in step S402 (cut-out processing). In step S404, the display 141 displays the image extracted in step S403 (live-view display).

Steps S401 to S404 are steps for performing live-view display and may be omitted. However, if the live-view display is performed, the user can capture an image at desired timing while checking the live-view display (the object). In addition, the user can check a brightness level, etc. of the live-view display and make an adjustment to obtain a desired imaging parameter so that the user can capture an image having a desired brightness level, etc. As described above, the live-view display may be performed on a separate device from the imaging apparatus 100 (an external device such as a smartphone or a tablet terminal connected to the imaging apparatus 100).

In step S405, the camera control unit 120 determines whether an instruction to start moving-image capturing (an instruction to start capturing a moving image) has been received from the user. If the instruction to start moving-image capturing has been received, the processing proceeds to step S406, and if not, the processing proceeds to step S424.

In step S406, the image sensors 102 and 112 capture images. In step S407, the cut-out processing unit 301 acquires the image captured by the image sensor 102. In steps S408, the cut-out processing unit 301 extracts a partial range of the image acquired in step S407 (cut-out processing). In step S409, the display 141 displays the image extracted in step S408 (live-view display).

In step S410, the cut-out processing unit 301 stores the range of the image extracted in step S408 in the memory 107 as a part of the non-VR moving image (moving-image buffering). During the moving-image buffering, the extracted range of the moving image is temporarily stored in the memory 107. In step S411, the image processing unit 108 sequentially reads out the image stored in the memory 107 and performs compression encoding processing on the read-out image (compression encoding processing on moving image). In step S412, the image processing unit 108 records the image obtained by the compression encoding processing in step S411 in the storage medium 131 as a part (frame) of the non-VR moving image. Steps S410 to S412 are repeated until the user issues an instruction to end the moving-image capturing. When step S412 is performed for the first time, a file of the non-VR moving image including the image obtained by the compression encoding processing is generated in the storage medium 131 (creation of a new file; moving-image generation). When step S412 is performed for the second and subsequent times, the image obtained by the compression encoding processing is sequentially stored in the existing file (updating of the file).

In the present embodiment, the range (the partial range of the captured image) to be recorded in the storage medium 131 is the same as the range of the live-view display. Alternatively, these ranges may be different from each other. However, if these ranges are the same, the user can capture a desired range of the moving image that the user has checked on the live-view display. Thus, the user can capture a moving image more comfortably. In addition, in the present embodiment, the range recorded in the storage medium 131, namely, the field angle of the moving image is fit within the image captured by one of the image sensors 102 and 112. By changing the orientation of the imaging apparatus 100, a person performing image capturing can adjust the range that the person wishes to record as a moving image to be captured by one of the image sensors 102 and 112.

In step S413, the camera control unit 120 determines whether an instruction to capture a still image (an instruction to perform still-image capturing) has been received from the user. If the instruction to capture a still image has been received, the processing proceeds to step S414, and if not, the processing proceeds to step S419.

In step S414, the VR processing unit 302 acquires the image captured by the image sensor 102 and the image captured by the image sensor 112. In step S415, the VR processing unit 302 generates a single VR image (360-degree image) by performing VR processing by using the two images acquired in step S414. In step S416, the VR processing unit 302 stores the VR image obtained by performing step S415 in the memory 117 as a VR still image (still-image buffering). In step S417, the image processing unit 118 performs compression encoding processing on the VR still image stored in the memory 117. In step S418, the image processing unit 118 generates a file for the VR still image obtained by the compression encoding processing in step S417 (still-image generation) and records the generated file in the storage medium 131. In step S418, VR information is stored in the VR still-image file, and a character string indicating that the file includes the VR image is added to the name of the VR still-image file.

The order of step S415 and step S416 may be reversed. Specifically, the two images captured by the image sensors 102 and 112 may directly be stored in the memory 117 (without performing the VR processing). Subsequently, a VR still image may be generated by reading out the two images stored in the memory 117 and performing the VR processing thereon.

In step S419, the camera control unit 120 determines whether an instruction to end moving-image capturing (an instruction to end capturing the moving image) has been received from the user. If the instruction to end moving-image capturing has been received, the processing proceeds to step S420, and if not, the processing proceeds to step S406.

In step S420, the cut-out processing unit 301 stops the moving-image buffering in step S410. In step S421, as in step S411, the image processing unit 108 performs compression encoding processing on the moving image. In step S422, as in step S412, the image processing unit 108 records the image obtained by the compression encoding processing in step S421 in the storage medium 131 as a part (frame) of the non-VR moving image.

In step S423, the camera control unit 120 determines whether the recording of the non-VR moving image into the storage medium 131 has been completed, namely, whether the non-VR moving image stored in the memory 107 by the moving-image buffering has entirely been recorded in the storage medium 131. If the recording has been completed (if an imaging standby state has been established), the processing proceeds to step S424. If not, the processing proceeds to step S421, and the processing in steps S421 to S423 is repeated until the non-VR moving image stored in the memory 107 by the moving-image buffering has entirely been recorded in the storage medium 131.

In step S424, the camera control unit 120 determines whether an instruction to end (cancel) the moving-image capturing mode has been received from the user. If the instruction has been received, the image-capturing processing in FIG. 4 ends, and if not, the processing proceeds to step S401.

Figure 5:
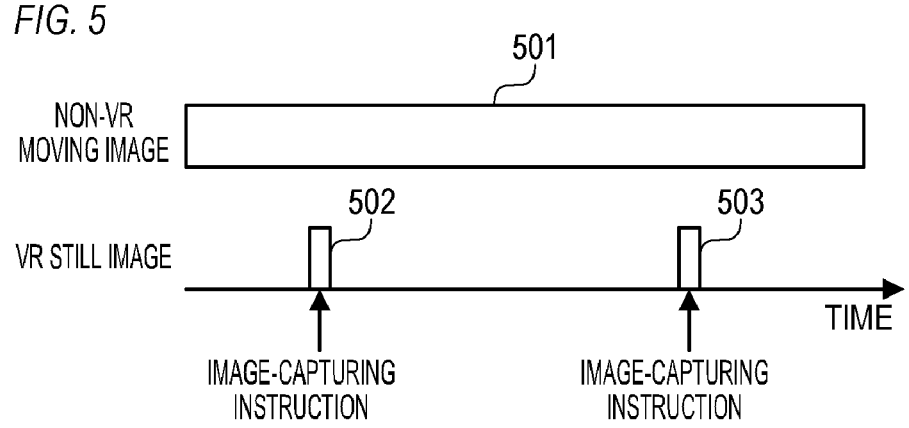
FIG. 5 illustrates an example of image capturing according to the present embodiment.

FIG. 5 illustrates an example of image capturing (capturing of a non-VR moving image and a VR still image) by using the image-capturing processing in FIG. 4. The horizontal axis in FIG. 5 represents a lapse of time. As illustrated in FIG. 5, according to the image-capturing processing in FIG. 4, VR still images 502 and 503 can be captured during an image-capturing period of a non-VR moving image 501. An instruction to capture a still image can be issued a plurality of times during the image-capturing period of the non-VR moving image 501, and every time the instruction to capture a still image is issued, a VR still image is captured. When capturing a plurality of VR still images, each of the VR still images captured is recorded in the storage medium 131 as an individual file. In FIG. 5, the instruction to capture a still image has been issued twice during the image-capturing period of the non-VR moving image 501. Accordingly, a file of the VR still image 502 and a file of the VR still image 503 are separately recorded in the storage medium 131. When recording the files, the non-VR moving image 501 and each of the VR still images 502 and 503 may be associated with each other and recorded in the storage medium 131. By doing so, the non-VR moving image and the VR still image that have captured the same object can easily be switched to be displayed as well as can easily be managed. Thus, the convenience is improved. The timing of capturing the VR still image 503 may be outside the image-capturing period of the non-VR moving image.

As described above, according to the present embodiment, both a VR still image and a non-VR moving image (a moving image with a normal field angle) can be captured. While the present embodiment has been described with an example in which the VR still image is a 360-degree image, the field angle of the VR still image may be smaller than 360 degrees or smaller than 180 degrees. However, the field angle of the VR still image is wider than that of the non-VR moving image.

In addition, while the present embodiment has been described with an example in which the VR still image is obtained by using the two image sensors 102 and 112, a VR still image may be generated from an image captured by a single image sensor, and the imaging apparatus 100 may include only one image sensor. Alternatively, a plurality of images may be captured by using three or more image sensors, and the VR processing may be performed on the captured images to generate a VR still image. Namely, in the present embodiment, a still image is generated by using a range of a captured image whose field angle is wider than that of a moving image.

In addition, the various kinds of control operations, which have been described above to be performed by the camera control unit 120, may be performed by a single hardware unit, or alternatively, a plurality of hardware units (for example, a plurality of processors or circuits) may share the processing and control the entire apparatus.

While the present invention has been described in detail based on the preferred embodiment, the present invention is not limited to this specific embodiment, and various modes are included in the present invention without departing from the gist of the present invention. The embodiment described above is merely an exemplary embodiment of the present invention, and it is also possible to combine the embodiment with another embodiment as appropriate.

While the above embodiment has been described with the exemplary case where the present invention is applied to the digital camera, the present invention is not limited to this exemplary case and is applicable to any apparatus (electronic device) capable of acquiring a captured image. For example, the present invention is applicable to a personal computer, a PDA, a mobile phone terminal, a portable image viewer, a printer, a digital photo frame, a music player, a game machine, an electronic book reader, a video player, and the like. The present invention is also applicable to a television device, a projection device, a tablet terminal, a smartphone, an AI speaker, a household electric appliance, an on-vehicle device, medical equipment, and the like.

In addition, the present invention is applicable not only to an imaging apparatus itself but also to a control apparatus that communicates with an imaging apparatus (including a network camera) via wired or wireless communication and remotely controls the imaging apparatus. Examples of the apparatus that remotely controls the imaging apparatus include a smartphone, a tablet PC, and a desktop PC. On the basis of operations and processing performed on the control apparatus side, the control apparatus can remotely control the imaging apparatus by notifying the imaging apparatus of a command that causes the imaging apparatus to perform various operations and settings. Alternatively, the control apparatus may receive a live-view image captured by the imaging apparatus via wired or wireless communication and display the received live-view image on the control apparatus side.

According to the present disclosure, both a VR image and an image with a normal field angle can be captured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091402, filed on May 14, 2019, which is hereby incorporated by reference herein in its entirety.

What is claimed is:

1. An electronic apparatus comprising at least one memory and at least one processor which function as:
   an acquisition unit configured to acquire a captured image; and
   a control unit configured to perform control to extract a part of the captured image and to record a moving image which includes a plurality of pieces of the part of the captured image in chronological order and is not a VR image in a storage, and perform control to execute image processing for obtaining a still image in a celestial-sphere format to the captured image and to record the still image that is a VR image and is based on the captured image in the storage, wherein the moving image is recorded in the storage without executing the image processing.

2. The electronic apparatus according to claim 1, wherein the acquisition unit acquires a plurality of images respectively captured by a plurality of image sensors, and the control unit
performs control to extract a part of the captured image.

3. The electronic apparatus according to claim 1, wherein the VR image is a celestial-sphere image or a half-celestial-sphere image, and the still image is recorded in the storage in association with at least one of information indicating a position that corresponds to a zenith direction, information indicating a position that corresponds to a nadir direction, and information indicating that the still image is a VR image.

4. The electronic apparatus according to claim 1, wherein the control unit performs control record, in the storage, the still image based on the captured image acquired by the acquiring unit during an image-capturing period of the moving image.

5. The electronic apparatus according to claim 1, wherein the control unit performs control to record, in the storage, the moving image and the still image that is based on the captured image acquired by the acquiring unit during an image-capturing period of the moving image in association with each other.

6. The electronic apparatus according to claim 1, wherein the VR image is a 360-degree image or a 180-degree image.

7. An electronic apparatus comprising at least one memory and at least one processor which function as:
an acquisition unit configured to acquire a captured image; and
a control unit configured to perform control to extract a part of the captured image and to record a moving image file of a moving image which includes a plurality of pieces of the part of the captured image in chronological order and is not a VR image in a storage, and perform control to record a still image file of a still image that is a VR image and is based on the captured image in the storage with including VR information for associating each direction from a position where image capturing is performed with each position in the still image, wherein
the moving image file is recorded in the storage without including the VR information.

8. The electronic apparatus according to claim 7, wherein each direction from the position where image capturing is performed is associated with each position in the still image by using an equidistant cylindrical projection.

9. The electronic apparatus according to claim 7, wherein the acquisition unit acquires a plurality of images respectively captured by a plurality of image sensors, and
the control unit performs control to extract a part of the captured image.

10. The electronic apparatus according to claim 7, wherein
the VR image is a celestial-sphere image or a half-celestial-sphere image, and
the still image is recorded in the storage in association with at least one of information indicating a position that corresponds to a zenith direction, information indicating a position that corresponds to a nadir direction, and information indicating that the still image is a VR image.

11. The electronic apparatus according to claim 7, wherein the control unit performs control to record, in the storage, the still image based on the captured image acquired by the acquiring unit during an image-capturing period of the moving image.

12. The electronic apparatus according to claim 7, wherein the control unit performs control to record, in the storage, the moving image and the still image that is based on the captured image acquired by the acquiring unit during an image-capturing period of the moving image in association with each other.

13. The electronic apparatus according to claim 7, wherein the VR image is a 360-degree image or a 180-degree image.

14. An electronic apparatus comprising at least one memory and at least one processor which function as:
an acquisition unit configured to acquire a captured image;
a control unit configured to perform control to extract a part of the captured image and to record a moving image which includes a plurality of pieces of the part of the captured image in chronological order and is not a VR image in a storage, and perform control to record a still image that is a VR image and is based on the captured image in the storage; and
a display control unit configured to perform control to display a part of the captured image on a display, wherein
the moving image recorded in the storage is corresponding to the part of the captured image displayed on the display.

15. The electronic apparatus according to claim 14, wherein
the acquisition unit acquires a plurality of images respectively captured by a plurality of image sensors, and
the control unit performs control to extract a part of the captured image.

16. The electronic apparatus according to claim 14, wherein
the VR image is a celestial-sphere image or a half-celestial-sphere image, and
the still image is recorded in the storage in association with at least one of information indicating a position that corresponds to a zenith direction, information indicating a position that corresponds to a nadir direction, and information indicating that the still image is a VR image.

17. The electronic apparatus according to claim 14, wherein the control unit performs control to record, in the storage, the still image based on the captured image acquired by the acquiring unit during an image-capturing period of the moving image.

18. The electronic apparatus according to claim 14, wherein the control unit performs control to record, in the storage, the moving image and the still image that is based on the captured image acquired by the acquiring unit during an image-capturing period of the moving image in association with each other.

19. The electronic apparatus according to claim 14, wherein the VR image is a 360-degree image or a 180-degree image.

20. An electronic apparatus comprising at least one memory and at least one processor which function as:
an acquisition unit configured to acquire a captured image;
a control unit configured to perform control to extract a part of the captured image and to record a moving image which includes a plurality of pieces of the part of the captured image in chronological order and is not a VR image in a storage, and perform control to record a still image which includes a single of the captured image in chronological order and is a VR image in the storage; and a reception unit configured to receive an instruction from a user, wherein the recording of the moving image in the storage starts in accordance with an instruction by a user to start recording a moving image and the recording of the moving image in the storage stops in accordance with an instruction by the user to stop recording the moving image, and the recording of the still image in the storage occurs in accordance with an instruction by the user to record a still image.

21. The electronic apparatus according to claim 20, wherein the acquisition unit acquires a plurality of images respectively captured by a plurality of image sensors, and the control unit performs control to extract a part of the captured image.

22. The electronic apparatus according to claim 20, wherein the VR image is a celestial-sphere image or a half-celestial-sphere image, and the still image is recorded in the storage in association with at least one of information indicating a position that corresponds to a zenith direction, information indicating a position that corresponds to a nadir direction, and information indicating that the still image is a VR image.

23. The electronic apparatus according to claim 20, wherein the control unit performs control to record, in the storage, the still image based on the captured image acquired by the acquiring unit during an image-capturing period of the moving image.

24. The electronic apparatus according to claim 20, wherein the control unit performs control to record, in the storage, the moving image and the still image that is based on the captured image acquired by the acquiring unit during an image-capturing period of the moving image in association with each other.

25. The electronic apparatus according to claim 20, wherein the VR image is a 360-degree image or a 180-degree image.

26. An electronic apparatus comprising at least one memory and at least one processor which function as:

an acquisition unit configured to acquire a plurality of images respectively captured by a plurality of image sensors;

a moving-image generation unit configured to generate a moving image based on an image captured by one of the plurality of image sensors;

a still-image generation unit configured to generate a still image having a field angle wider than that of the moving image based on the plurality of images captured by the plurality of image sensors;

a control unit configured to perform control to record each of the moving image and the still image in a storage; and a reception unit configured to receive a capturing start instruction of a moving image, a capturing end instruction of the moving image, and a capturing instruction of a still image, wherein the moving image is generated based on an image captured by one of the plurality of image sensors during a period from reception of the capturing start instruction of the moving image to reception of the capturing end instruction of the moving image, and the still image is generated based on the plurality of images captured by the plurality of image sensors in accordance with the capturing instruction received during the period from reception of the capturing start instruction of the moving image to reception of the capturing end instruction of the moving image.

27. The electronic apparatus according to claim 26, wherein the still image is a celestial-sphere image or a half-celestial-sphere image, and the control unit performs control to record, in the storage, the still image in association with at least one of information indicating a position that corresponds to a zenith direction, information indicating a position that corresponds to a nadir direction, and information indicating that the still image is the celestial-sphere image or the half-celestial-sphere image.

28. The electronic apparatus according to claim 26, wherein the still image is a 360-degree image or a 180-degree image.

29. An electronic apparatus comprising at least one memory and at least one processor which function as:

an acquisition unit configured to acquire a plurality of images respectively captured by a plurality of image sensors;

a moving-image generation unit configured to generate a moving image based on an image captured by one of the plurality of image sensors;

a still-image generation unit configured to generate a still image having a field angle wider than that of the moving image based on the plurality of images captured by the plurality of image sensors; and a control unit configured to perform control to record each of the moving image and the still image in a storage, wherein the moving image and the still image are recorded in the storage in association with each other, and the still image is generated based on the plurality of images captured by the plurality of image sensors in accordance with the capturing instruction received during the period from reception of the capturing start instruction of the moving image to reception of the capturing end instruction of the moving image.

30. The electronic apparatus according to claim 29, wherein the still image is a celestial-sphere image or a half-celestial-sphere image, and the control unit performs control to record, in the storage, the still image in association with at least one of information indicating a position that corresponds to a zenith direction, information indicating a position that corresponds to a nadir direction, and information indicating that the still image is the celestial-sphere image or the half-celestial-sphere image.

31. The electronic apparatus according to claim 29, wherein the still image is a 360-degree image or a 180-degree image.

32. An electronic apparatus comprising at least one memory and at least one processor which function as:

an acquisition unit configured to acquire a plurality of images respectively captured by a plurality of image sensors;

a moving-image generation unit configured to generate a moving image based on an image captured by one of the plurality of image sensors;

a still-image generation unit configured to generate a still image having a field angle wider than that of the moving image based on the plurality of images captured by the plurality of image sensors; and a control unit configured to perform control to record each of the moving image and the still image in a storage, wherein the still-image generation unit generates the still image by performing image processing for obtaining an image in a VR format to a plurality of images captured by the plurality of image sensors, and the moving-image generation unit generates the moving image based on an image captured by one of the plurality of image sensors without performing the image processing to the image.

33. The electronic apparatus according to claim 32, wherein the still image is a celestial-sphere image or a half-celestial-sphere image, and the control unit performs control to record, in the storage, the still image in association with at least one of information indicating a position that corresponds to a zenith direction, information indicating a position that corresponds to a nadir direction, and information indicating that the still image is the celestial-sphere image or the half-celestial-sphere image.

34. The electronic apparatus according to claim 32, wherein the still image is a 360-degree image or a 180-degree image.

35. An electronic apparatus comprising at least one memory and at least one processor which function as:

an acquisition unit configured to acquire a plurality of images respectively captured by a plurality of image sensors;

a moving-image generation unit configured to generate a moving image based on an image captured by one of the plurality of image sensors;

a still-image generation unit configured to generate a still image having a field angle wider than that of the moving image based on the plurality of images captured by the plurality of image sensors; and a control unit configured to perform control to record each of the moving image and the still image in a storage, wherein a still image file of the still image is recorded in the storage with including VR information for associating each direction from a position where image capturing is performed with each position in an image, and a moving image file of the moving image is recorded in the storage without including the VR information.

36. The electronic apparatus according to claim 35, wherein the still image is a celestial-sphere image or a half-celestial-sphere image, and the control unit performs control to record, in the storage, the still image in association with at least one of information indicating a position that corresponds to a zenith direction, information indicating a position that corresponds to a nadir direction, and information indicating that the still image is the celestial-sphere image or the half-celestial-sphere image.

37. The electronic apparatus according to claim 35, wherein the still image is a 360-degree image or a 180-degree image.

38. An electronic apparatus comprising at least one memory and at least one processor which function as:

an acquisition unit configured to acquire a plurality of images respectively captured by a plurality of image sensors;

a moving-image generation unit configured to generate a moving image based on an image captured by one of the plurality of image sensors;

a still-image generation unit configured to generate a still image having a field angle wider than that of the moving image based on the plurality of images captured by the plurality of image sensors; and a control unit configured to perform control to record each of the moving image and the still image in a storage, wherein the control unit performs control to record an image file of the still image in the storage with including a character string in a file name, the character string indicating that the still image is a VR image, and performs control to record an image file of the moving image in the storage without including the character string in a file name.

39. The electronic apparatus according to claim 38, wherein the still image is a celestial-sphere image or a half-celestial-sphere image, and the control unit performs control to record, in the storage, the still image in association with at least one of information indicating a position that corresponds to a zenith direction, information indicating a position that corresponds to a nadir direction, and information indicating that the still image is the celestial-sphere image or the half-celestial-sphere image.

40. The electronic apparatus according to claim 38, wherein the still image is a 360-degree image or a 180-degree image.

41. An electronic apparatus comprising at least one memory and at least one processor which function as:

an acquisition unit configured to acquire a plurality of images respectively captured by a plurality of image sensors;

a moving-image generation unit configured to generate a moving image based on an image captured by one of the plurality of image sensors;

a still-image generation unit configured to generate a still image having a field angle wider than that of the moving image based on the plurality of images captured by the plurality of image sensors;

a control unit configured to perform control to record each of the moving image and the still image in a storage; and a display control unit configured to perform control to display a part of one of the plurality of captured images acquired by the acquisition unit on a display, wherein the moving-image generation unit generates the moving image based on the part of the one of the plurality of captured images displayed on the display.

42. The electronic apparatus according to claim 41, wherein the still image is a celestial-sphere image or a half-celestial-sphere image, and the control unit performs control to record, in the storage, the still image in association with at least one of information indicating a position that corresponds to a zenith direction, information indicating a position that corresponds to a nadir direction, and information indicating that the still image is the celestial-sphere image or the half-celestial-sphere image.

43. The electronic apparatus according to claim 41, wherein the still image is a 360-degree image or a 180-degree image.

44. A control method of an electronic apparatus, comprising:
acquiring a captured image;
performing control to extract a part of the captured image and to record a moving image which includes a plurality of pieces of the part of the captured image in chronological order and is not a VR image in a storage; and
performing control to execute image processing for obtaining a still image in a celestial-sphere format to the captured image and to record the still image that is a VR image and is based on the captured image in the storage, wherein
the moving image is recorded in the storage without executing the image processing.

45. A control method of an electronic apparatus, comprising:
acquiring a captured image;
performing control to extract a part of the captured image and to record a moving image file of a moving image which includes a plurality of pieces of the part of the captured image in chronological order and is not a VR image in a storage; and
performing control to record a still image file of a still image that is a VR image and is based on the captured image in the storage with including VR information for associating each direction from a position where image capturing is performed with each position in the still image, wherein
the moving image file is recorded in the storage without including the VR information.

46. A control method of an electronic apparatus, comprising:
acquiring a captured image;
performing control to extract a part of the captured image and to record a moving image which includes a plurality of pieces of the part of the captured image in chronological order and is not a VR image in a storage;
performing control to record a still image that is a VR image and is based on the captured image in the storage; and
performing control to display a part of the captured image on a display, wherein
the moving image recorded in the storage is corresponding to the part of the captured image displayed on the display.

47. A control method of an electronic apparatus, comprising:
acquiring a captured image;
performing control to extract a part of the captured image and to record a moving image which includes a plurality of pieces of the part of the captured image in chronological order and is not a VR image in a storage;
performing control to record a still image which includes a single of the captured image in chronological order and is a VR image in the storage; and
receiving an instruction from a user, wherein
the recording of the moving image in the storage starts in accordance with an instruction by a user to start recording a moving image and the recording of the moving image in the storage stops in accordance with an instruction by the user to stop recording the moving image, and
the recording of the still image in the storage occurs in accordance with an instruction by the user to record a still image.

48. A control method of an electronic apparatus, comprising:
acquiring a plurality of images respectively captured by a plurality of image sensors;
generating a moving image based on an image captured by one of the plurality of image sensors;
generating a still image having a field angle wider than that of the moving image based on the plurality of images captured by the plurality of image sensors;
performing control to record each of the moving image and the still image in a storage; and
receiving a capturing start instruction of a moving image, a capturing end instruction of the moving image, and a capturing instruction of a still image, wherein
the moving image is generated based on an image captured by one of the plurality of image sensors during a period from reception of the capturing start instruction of the moving image to reception of the capturing end instruction of the moving image, and
the still image is generated based on the plurality of images captured by the plurality of image sensors in accordance with the capturing instruction received during the period from reception of the capturing start instruction of the moving image to reception of the capturing end instruction of the moving image.

49. A control method of an electronic apparatus, comprising:
acquiring a plurality of images respectively captured by a plurality of image sensors;
generating a moving image based on an image captured by one of the plurality of image sensors;
generating a still image having a field angle wider than that of the moving image based on the plurality of images captured by the plurality of image sensors; and
performing control to record each of the moving image and the still image in a storage, wherein
the moving image and the still image are recorded in the storage in association with each other, and
the still image is generated based on the plurality of images captured by the plurality of image sensors in accordance with the capturing instruction received during the period from reception of the capturing start instruction of the moving image to reception of the capturing end instruction of the moving image.

50. A control method of an electronic apparatus, comprising:
acquiring a plurality of images respectively captured by a plurality of image sensors;
generating a moving image based on an image captured by one of the plurality of image sensors;
generating a still image having a field angle wider than that of the moving image based on the plurality of images captured by the plurality of image sensors; and
performing control to record each of the moving image and the still image in a storage, wherein
the still image is generated by performing image processing for obtaining an image in a VR format to a plurality of images captured by the plurality of image sensors, and
the moving image is generated based on an image captured by one of the plurality of image sensors without performing the image processing to the image.

51. A control method of an electronic apparatus, comprising:
acquiring a plurality of images respectively captured by a plurality of image sensors;
generating a moving image based on an image captured by one of the plurality of image sensors;
generating a still image having a field angle wider than that of the moving image based on the plurality of images captured by the plurality of image sensors; and
performing control to record each of the moving image and the still image in a storage, wherein
a still image file of the still image is recorded in the storage with including VR information for associating each direction from a position where image capturing is performed with each position in an image, and
a moving image file of the moving image is recorded in the storage without including the VR information.

52. A control method of an electronic apparatus, comprising:
acquiring a plurality of images respectively captured by a plurality of image sensors;
generating a moving image based on an image captured by one of the plurality of image sensors;
generating a still image having a field angle wider than that of the moving image based on the plurality of images captured by the plurality of image sensors; and
performing control to record each of the moving image and the still image in a storage, wherein
an image file of the still image is recorded in the storage with including a character string in a file name, the character string indicating that the still image is a VR image, and
an image file of the moving image is recorded in the storage without including the character string in a file name.

53. A control method of an electronic apparatus, comprising:
acquiring a plurality of images respectively captured by a plurality of image sensors;
generating a moving image based on an image captured by one of the plurality of image sensors;
generating a still image having a field angle wider than that of the moving image based on the plurality of images captured by the plurality of image sensors;
performing control to record each of the moving image and the still image in a storage; and
performing control to display a part of one of the plurality of captured images on a display, wherein
the moving image is generated based on the part of the one of the plurality of captured images displayed on the display.

54. A non-transitory computer readable medium that stores a program, wherein
the program causes a computer to execute the control method of an electronic apparatus according to claim 44.

55. A non-transitory computer readable medium that stores a program, wherein
the program causes a computer to execute the control method of an electronic apparatus according to claim 45.

56. A non-transitory computer readable medium that stores a program, wherein
the program causes a computer to execute the control method of an electronic apparatus according to claim 46.

57. A non-transitory computer readable medium that stores a program, wherein
the program causes a computer to execute the control method of an electronic apparatus according to claim 47.

58. A non-transitory computer readable medium that stores a program, wherein
the program causes a computer to execute the control method of an electronic apparatus according to claim 48.

59. A non-transitory computer readable medium that stores a program, wherein
the program causes a computer to execute the control method of an electronic apparatus according to claim 49.

60. A non-transitory computer readable medium that stores a program, wherein
the program causes a computer to execute the control method of an electronic apparatus according to claim 50.

61. A non-transitory computer readable medium that stores a program, wherein
the program causes a computer to execute the control method of an electronic apparatus according to claim 51.

62. A non-transitory computer readable medium that stores a program, wherein
the program causes a computer to execute the control method of an electronic apparatus according to claim 52.

63. A non-transitory computer readable medium that stores a program, wherein
the program causes a computer to execute the control method of an electronic apparatus according to claim 53.

* * * * *